United States Patent
Ladouceur

(10) Patent No.: US 9,051,194 B1
(45) Date of Patent: Jun. 9, 2015

(54) METHOD OF GENERATING MICRO AND NANO BUBBLES IN A FLUID

(71) Applicant: Nels Robert Ladouceur, Delta (CA)

(72) Inventor: Nels Robert Ladouceur, Delta (CA)

( * ) Notice: Subject to any disclaimer, the term of this patent is extended or adjusted under 35 U.S.C. 154(b) by 32 days.

(21) Appl. No.: 13/999,053

(22) Filed: Jan. 9, 2014

(51) Int. Cl.
*B01F 3/04* (2006.01)
*C02F 1/24* (2006.01)

(52) U.S. Cl.
CPC ........................... *C02F 1/24* (2013.01)

(58) Field of Classification Search
CPC ............ B01F 3/04014; B01F 3/04049; B01F 3/04439; B01F 3/04496; B01F 3/0876; B01F 5/0415; B01F 5/0682; B01F 5/0688
USPC ............................................. 261/65, 76, 115
See application file for complete search history.

(56) References Cited

U.S. PATENT DOCUMENTS

| | | | |
|---|---|---|---|
| 3,251,586 A * | 5/1966 | Scott et al. ........................ | 261/76 |
| 5,254,292 A * | 10/1993 | Gabryelczyk et al. ........... | 261/76 |
| 5,601,724 A * | 2/1997 | St. Pierre ........................ | 210/722 |
| 6,540,211 B2 * | 4/2003 | Tseng ............................... | 261/65 |
| 7,419,143 B2 * | 9/2008 | Lee et al. ......................... | 261/76 |
| 7,758,024 B2 * | 7/2010 | Takahashi et al. ............... | 261/28 |
| 2014/0367345 A1 * | 12/2014 | Greene et al. .................. | 210/758 |
| 2015/0030991 A1 * | 1/2015 | Sung et al. ....................... | 433/81 |

* cited by examiner

*Primary Examiner* — Charles Bushey

(57) ABSTRACT

A method according to the present invention for generating micro and nano bubbles of substantially five microns or less in a fluid, is accomplished by injecting a gas through a gas feed conduit into a liquid stream to create a combined flow of gas and liquid, the gas being up to 15 volume percent at STP of the liquid being streamed. This combined flow is contained within a closed container having at least one primary zone and a secondary zone. The combined flow is pressurizing within the closed container primary zone(s) and the pressurized combined flow is maintained at a predetermined first fluid pressure level of substantially between 100 and 150 PSIG within the closed container primary zone(s). Then the pressurized combined flow is directed from the closed container primary zone(s) to the closed container secondary zone through a plate/disk(s) having one or more orifices/ports restricting the combined flow through the orifice/port(s). A predetermined second fluid pressure level within the closed container secondary zone(s) is within a pressure differential range of substantially 60 percent of the combined flow within the closed container primary zone.

18 Claims, 5 Drawing Sheets

METHOD OF GENERATING MICRO AND NANO BUBBLES IN A FLUID

FIELD OF THE INVENTION

The invention relates to a method for generating very fine micro and nano sized bubbles in a fluid (typically water).

BACKGROUND OF THE INVENTION

It is known that air or gas bubbles can be used to separate particulates from a fluid such as water by floating the particulates to the surface of the fluid for removal. The smaller and more numerous the bubbles, the more efficient the separation. This is usually referred to as "dissolved air flotation". Further, it has been found that micro and nano bubbles can be generated, nano bubbles which although invisible to the eye can be detected with a Turbidity Meter (Nephelometric Turbidity Unit). Such micro and nano bubbles can contribute to maintaining high dissolved oxygen levels when using air or oxygen (or other gasses) in water.

It has been found that micro and nano bubbles generated using this apparatus can supersaturate oxygen dissolved in water at STP (Standard Pressure and Temperature) up to 40 mg/liter. Normal saturation for oxygen in water is about 13 mg/liter. It should be noted that for the method of the present invention, the term "fluid" or "fluids" may include a gas or a liquid and where this fluid may include suspended particulates, and a liquid may include more than one type of liquid.

Accordingly, it is an object of the present invention to provide a method that can produce extremely tiny bubbles, 5 microns or less in diameter; wherein referred to as micro and nano bubbles.

SUMMARY OF THE INVENTION

The method and apparatus described herein for generating micro and nano bubbles and for supersaturating, mixing and/or blending fluids is capable of functioning within numerous applications. In general the process includes a pressurized container, wherein the container has an inlet and an outlet. A plate or disk is installed near the inlet end that contains fixed sized orifices or ports, the number and size being dependent on the flow rate through the apparatus, which is affected by fluid viscosity. An optimized pressure drop is created across the ported plate by tuning the port/orifice size with a backpressure regulator at the outlet of the vessel/container prior to the aerated fluid being released to near atmospheric pressure in, usually, another container/vessel. Micro and nano bubbles are released in the container downstream of the backpressure regulator.

As mentioned above, micro and nano bubbles, are useful for particulate flotation, for example in dissolved gas flotation or dissolved air flotation systems. Additionally, generated air or oxygen micro and nano bubbles can be used for an efficient method of iron removal from contaminated water. An optimized pressure drop across the ported plate generates micro and nano bubbles in area immediately downstream of the ported plate, and causes the fluids to dynamically commingle. The pressure of the co-mingled fluid and gas at the inlet to the vessel/container will be from 100 to 150 PSIG (Pounds per Square Inch Gauge) depending on the type of fluid being pumped to the vessel/container. A pressure drop of about 40% of the container inlet pressure will be created in the vessel/container immediately downstream of the ported plate. The balance of the pressure drop (to at or near atmospheric pressure) will take place immediately downstream of the backpressure regulator where the micro and nano bubbles are created.

The vessel/container may include a vent valve, positioned at the upper portion of the vessel/container for release of excess air or gas build-up in the vessel/container.

In summary, the method according to the present invention for generating micro and nano bubbles of substantially five microns or less in a fluid may be characterized as a method that starts by injecting a gas through a gas feed conduit into a liquid stream to create a combined flow of gas and liquid where the gas can be up to 15 volume percent at STP (Standard Pressure and Temperature) of the liquid being streamed. This combined flow is contained within a closed container, where the closed container includes a primary zone and a secondary zone.

The combined flow is pressurizing within the closed container primary zone and the pressurized combined flow is maintained at a predetermined first fluid pressure level of substantially between 100 and 150 PSIG within the closed container primary zone. Then the pressurized combined flow is directed from the closed container primary zone to the closed container secondary zone through a plate/disk having one or more orifices/ports restricting the combined flow through the orifice/port(s).

Then measuring and maintaining a predetermined second fluid pressure level within the closed container secondary zone within a pressure differential range of substantially 60 percent (approximately 60 and 100 PSIG within the secondary zone, within the pressure range of the primary zone) of the combined flow within the closed container primary zone. A backpressure regulator is mounted to and is in communication with a combined flow outlet conduit, where the combined flow outlet conduit is mounted to the closed container secondary zone.

The orifice/port(s) are preferably a diameter of between 0.200 of an inch and 0.400 of an inch. The amount or number of the orifice/port(s) on the plate/disc within the closed container is/are normally between 1 and 10/The hole size will depending on the flow volume characteristics and the total flow volume requirement(s). Generally, one hole of approximately 0.200" will allow effective flow of approximately 5 imperial gallons per minute and one hole of approximately 400" will allow effective flow of approximately 12 imperial gallons per minute.

An optional step of reducing any residual gas that collects in the pressure container/vessel through an excess vapor vent exhausting to the outside atmosphere.

The closed container primary zone is preferably about 30 percent of the closed container secondary zone size. The closed container is capable of being duplicated in a parallel circuit multiple times, depending on the total flow volume requirement(s).

The following are micro and nano bubble size calibration adjusting steps requirements; first predetermining the combined flow, then predetermining the diameter and/or the number of the orifice/port(s), then predetermining the combined flow pressure in the primary zone(s), then measuring and adjusting the combined flow pressure in the secondary zone by adjusting the backpressure, then measuring size of the micro and nano bubbles in the outflow conduit. If the micro and nano bubbles are still oversize of five microns then again measuring and adjusting the combined flow pressure in the secondary zone by adjusting the backpressure. If the micro and nano bubbles are still oversize of five microns then again adjusting the pressure differential by adjusting the diameter and/or the number of the orifice/port(s), then again measuring the size of the micro and nano bubbles in the outflow conduit, If the micro and nano bubbles are still oversize of five microns then again measuring and adjusting the combined flow pressure in the secondary zone by adjusting the backpressure. If the micro and nano bubbles are still oversize of five microns then again measuring the size of the micro and nano bubbles in the outflow conduit, then if the micro and nano bubbles are still oversize of five microns then adjusting the combined flow volume capacity by duplicating the closed container in parallel circuit. If the micro and nano bubbles are still oversize of five microns then again measuring size of the micro and nano bubbles in the outflow conduit, and then finally if required redo steps above for each closed container starting at the beginning.

BRIEF DESCRIPTION OF THE DRAWINGS

Advantages of the present invention will become more fully appreciated as the same becomes better understood when considered in conjunction with the following detailed description and accompanying drawings, in which like reference characters designate the same or similar parts throughout the views, wherein.

DESCRIPTION OF THE INVENTION

Figure 1:
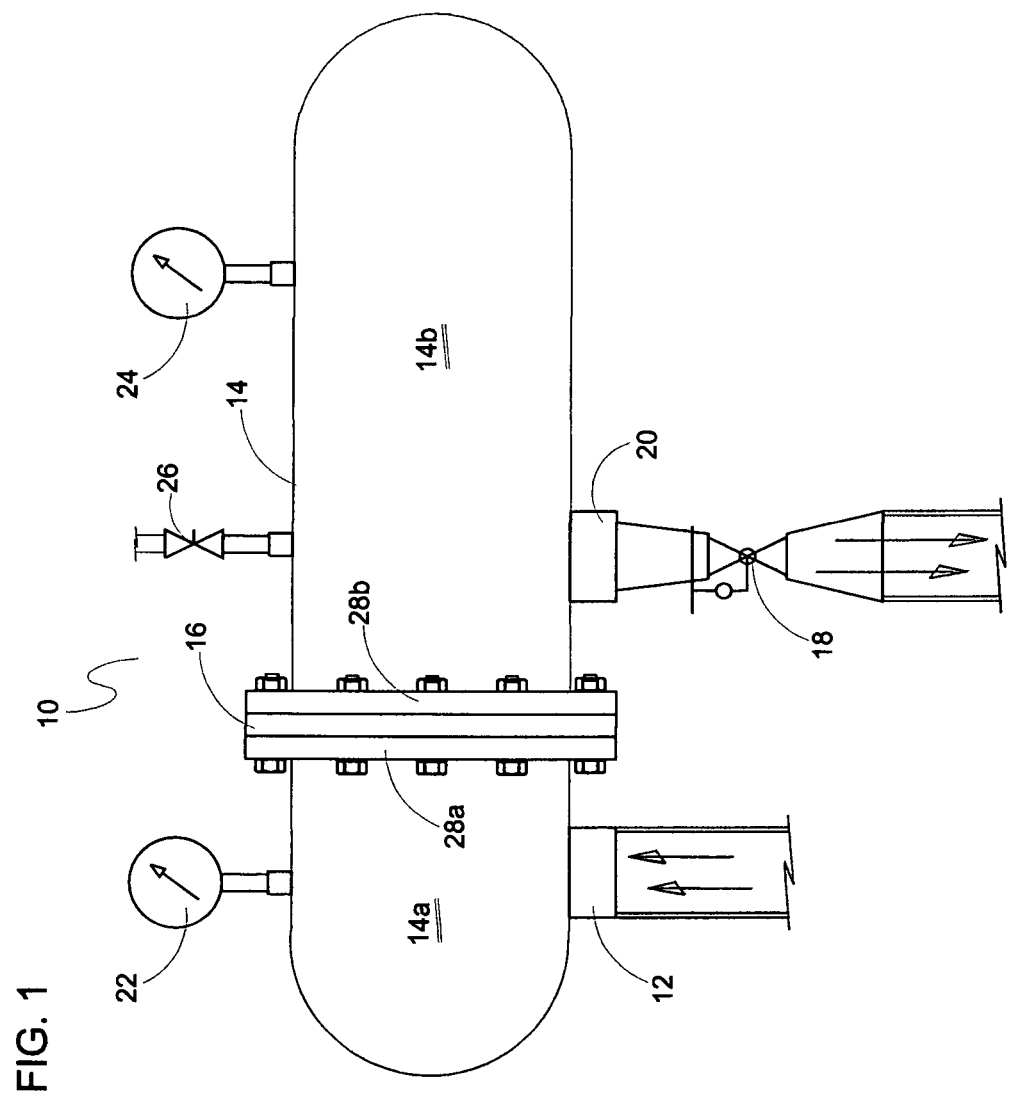
FIG. 1 is a partial schematical side elevational view of the preferred embodiment of the invention.

A device used in the method for generating micro and nano bubbles of substantially five microns or less in a fluid flow is generally referred to as 10 as seen in FIG. 1.

As shown in FIG. 1, a gas is injected into a liquid stream to create a combined flow of gas and liquid which is directed through a conduit inlet 12. The combined flow is streamed through inlet 12 into a closed container 14. Closed container 14 includes a primary zone 14a and a secondary zone 14b that are separated by a removable ported plate 16. Ported plate 16 restricts the combined flow and is regulated by a backpressure regulator 18, which is shown mounted to and in communication with a combined flow outlet conduit 20. Primary zone 14a includes a pressure gauge 22 and secondary zone 14b includes a pressure gauge 24. Secondary zone 14b is shown with an optional excess vapour vent 26, for exhausting any excess gas to the outside atmosphere. Also shown here are assembly flanges 28a and 28b, where closed container 14 assembly flanges 28a and 28b attach ported plate 16 therebetween.

Figure 2:
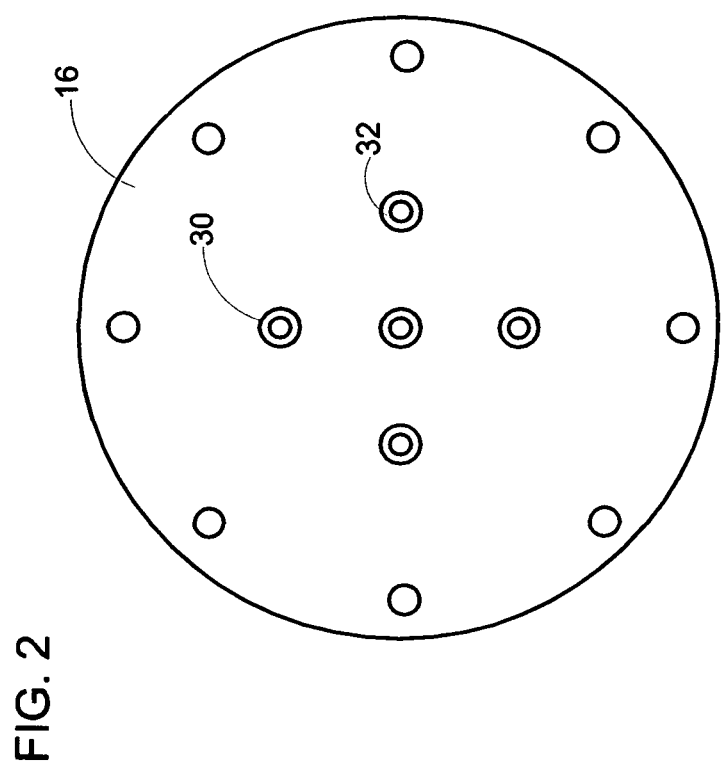
FIG. 2 is a side elevation view of the ported plate.

As shown in FIG. 2, ported plate 16 includes centralized ports 30, shown with replaceable bushings 32 installed. Bushings 32 allow for easy size adjustment, as well as the ability to change out the port bushing(s) when they are worn through extended use. Plate 16 is shown here with five ports.

Figure 3:
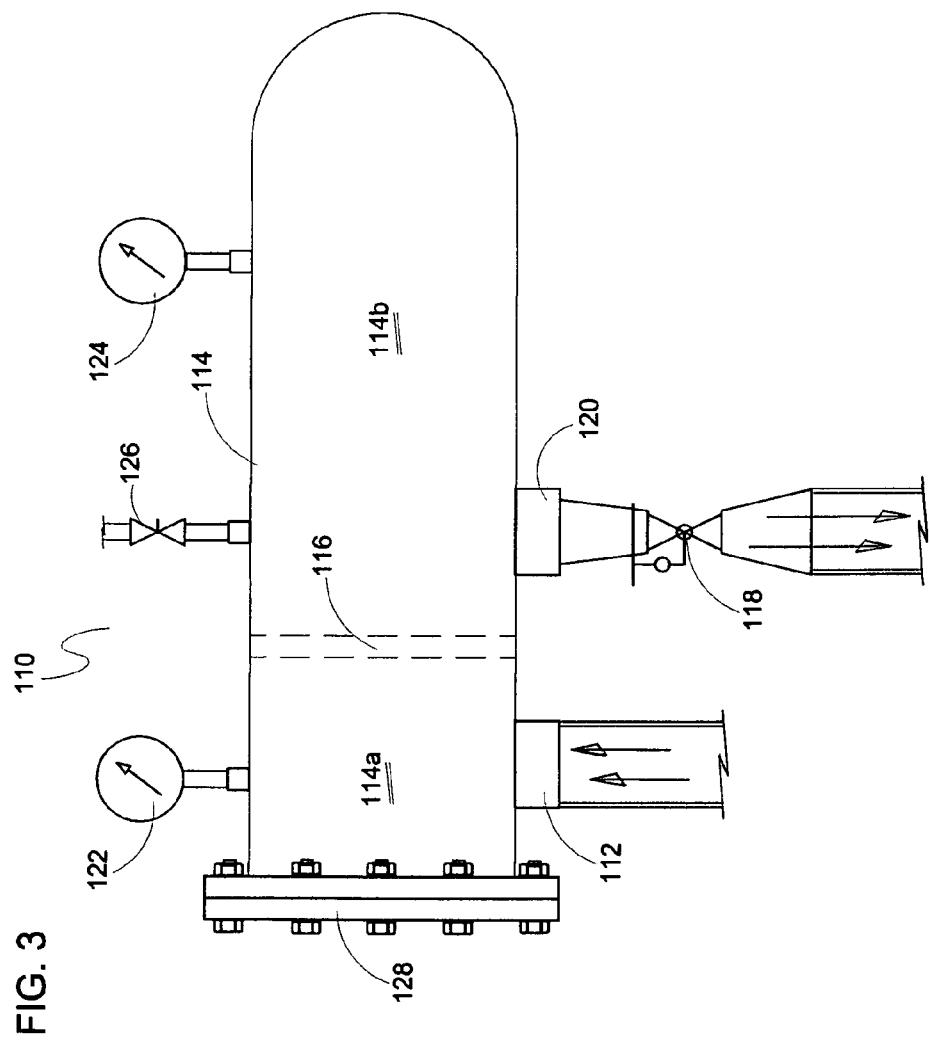
FIG. 3 is a partial schematical side elevational view of an alternate of the embodiment of the invention.
Figure 4:
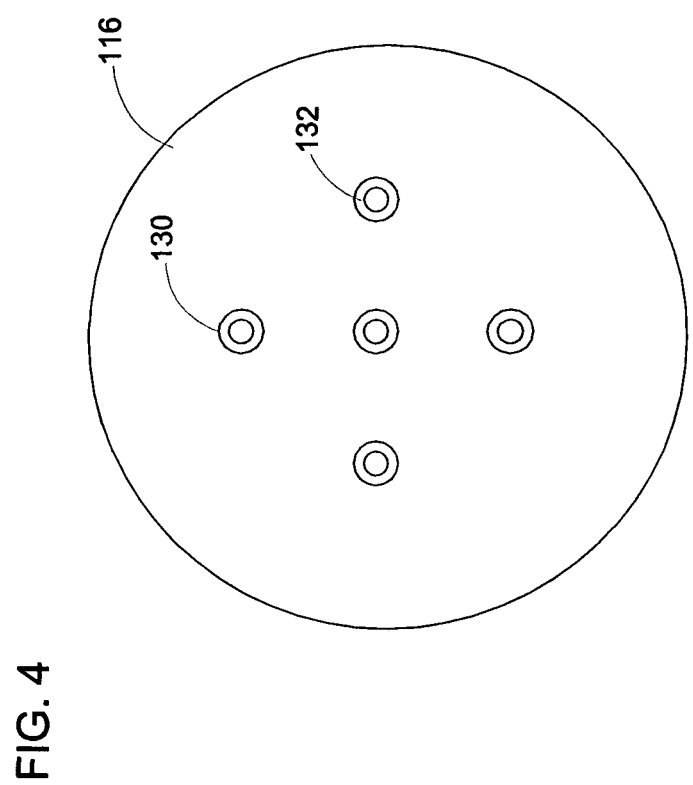
FIG. 4 is a side elevation view of the alternate ported plate.

As shown in FIG. 3 an alternate embodiment 110, where a combined flow of gas and liquid is directed through a conduit inlet 112 is streamed through inlet 112 into a closed container 114. Closed container 114 includes a primary zone 114a and a secondary zone 114b that are separated by a ported plate 116 fixed within closed container 114. Ported plate 116 restricts the combined flow and is regulated by a backpressure regulator 118, which is shown mounted to and in communication with a combined flow outlet conduit 120. Primary zone 114a includes a pressure gauge 122 and secondary zone 114b includes a pressure gauge 124. Secondary zone 114b is shown with an optional excess vapour vent 126, for exhausting any excess gas to the outside atmosphere. Also shown here is access cap 128, As shown in FIG. 4, ported plate 116 includes centralized ports 130, shown here with replaceable bushings 132 installed. Plate 116 is shown here with five ports.

Figure 5:
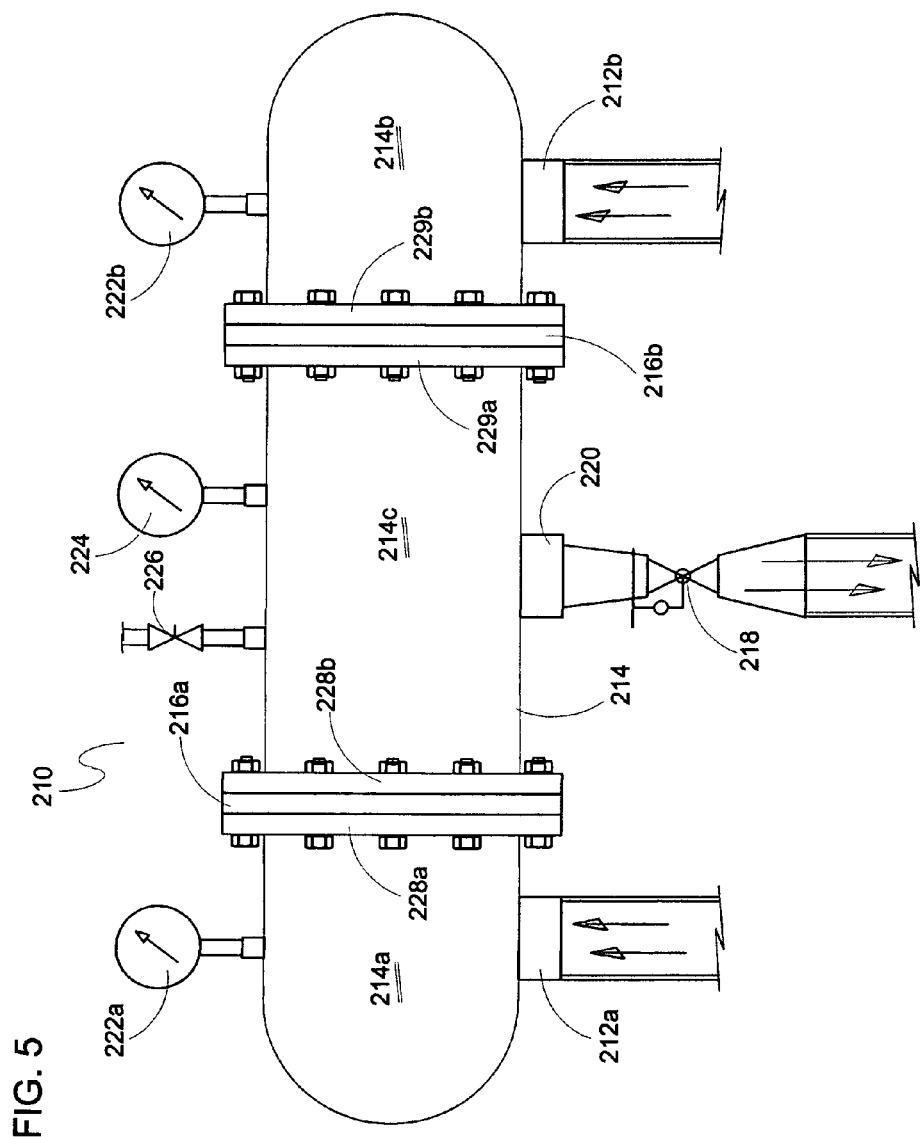
FIG. 5 is a partial schematical side elevational view of another alternate of the embodiment of the invention.

As shown in FIG. 5, another alternate embodiment 212, where a combined flow of gas and liquid is directed through a conduit inlets 212a and 212b. The combined flow is streamed through inlets 212a and 212b into a closed container 214. Closed container 214 includes two primary zones 214a and 214b, and a secondary zone 214c, which are separated by two removable ported plates 216a and 216b. Ported plates 216a and 216b restrict the combined flow and is regulated by a backpressure regulator 218, which is shown mounted to and in communication with a combined flow outlet conduit 220. Primary zones 214a and 214b include a pressure gauge 222a and 222b, and secondary zone 214c includes a pressure gauge 224. Secondary zone 214c is shown with an optional excess vapour vent 226, for exhausting any excess gas to the outside atmosphere. Also shown here are closed container 214 assembly flanges 228a, 228b, 229a and 229b, where assembly flanges 228a and 228b attach ported plate 216a therebetween, and where assembly flanges 229a and 229b attach ported plate 216b therebetween.

The foregoing descriptions of specific embodiments of the present invention have been presented for purposes of illustration and description. They are not intended to be exhaustive or to limit the invention to the precise forms disclosed, and obviously modifications and variations are possible in light of the above teaching. The embodiments were chosen and described in order to best explain the principles of the invention and its practical application, to thereby enable others skilled in the art to best utilize the invention with various modifications as are suited to the particular use contemplated. It is intended that the scope of the invention be defined by the Claims appended hereto and their equivalents.

What is claimed is:

1. A method for generating micro and nano bubbles of substantially five microns or less in a fluid flow, comprising the steps of:

injecting a gas through a gas feed conduit into a liquid stream conduit to create a combined flow of gas and liquid where said gas can be up to 15 volume percent at STP of said liquid being streamed;

directing said combined flow through an inlet into a closed container, wherein said closed container includes a primary zone and a secondary zone;

pressurizing said combined flow within said closed container primary zone and maintaining said pressurized combined flow to a predetermined first fluid pressure level of substantially between 100 and 150 PSIG within said closed container primary zone;

directing said pressurized combined flow from said closed container primary zone to said closed container secondary zone through a plate/disk having one or more orifices/ports restricting flow of said combined flow through said orifice/port(s); and measuring and maintaining a predetermined second fluid pressure level within said closed container secondary zone within a pressure differential range of substantially 60 percent of said combined flow within said closed container primary zone, with a backpressure regulator mounted to and in communication with a combined flow outlet conduit, where said combined flow outlet conduit is mounted to said closed container secondary zone, to thereby generate micro and nano bubbles in said combined flow downstream of said backpressure regulator.

2. The method according to claim 1, wherein said combined flow is substantially between 60 and 100 PSIG within said closed container secondary zone, within the pressure range within said closed container primary zone.

3. The method according to claim 1, further comprising the step of reducing any residual gas that collects in said closed container secondary zone through an excess vapour vent exhausting to the outside atmosphere.

4. The method according to claim 1, wherein said closed container primary zone is substantially 30 percent of said closed container secondary zone size.

5. The method according to claim 1, wherein said orifice/port(s) are a diameter of between 0.2 of an inch and 0.4 of an inch.

6. The method according to claim 1, wherein amount of said orifice/port(s) on said plate/disc are normally between 1 and 10, depending on flow volume characteristics and total flow volume requirements.

7. The method according to claim 1, wherein said closed container is capable of being duplicated in a parallel circuit at least once and up to multiple times, depending on flow volume characteristics and total flow volume requirements.

8. The method according to claim 1, wherein injecting of said gas into said liquid is through a gas feed conduit directly into said closed container primary zone to create said combined flow.

9. The method according to claim 1, further comprising micro and nano bubble calibration adjusting steps comprising:
   a) predetermining said combined flow;
   b) predetermining said diameter and/or said number of the orifice/port(s);
   c) predetermining said combined flow pressure in said primary zone;
   d) measuring and adjusting said combined flow pressure in said secondary zone by adjusting said backpressure;
   e) measuring size of said micro and nano bubbles in said outflow conduit;
   f) measuring and adjusting said combined flow pressure in said secondary zone by adjusting said backpressure;
   g) adjusting said pressure differential by adjusting said diameter and/or said number of the orifice/port(s);
   h) measuring size of said micro and nano bubbles in said outflow conduit;
   i) measuring and adjusting said combined flow pressure in said secondary zone by adjusting said backpressure;
   j) measuring size of said micro and nano bubbles in said outflow conduit;
   k) if micro and nano bubbles are still oversize of five microns then adjusting said combined flow volume capacity by duplicating said closed container in parallel circuit;
   l) measuring size of said micro and nano bubbles in said outflow conduit;
   m) if micro and nano bubbles are still oversize of five microns then redoing steps above starting with a).

10. A method for generating micro and nano bubbles of substantially five microns or less in a fluid flow, comprising the steps of:
    injecting a gas through a gas feed conduit into a liquid stream conduit to create a combined flow of gas and liquid where said gas can be up to 15 volume percent at STP of said liquid being streamed;
    directing said combined flow through two inlets into a closed container, wherein said closed container includes a two primary zones and one secondary zone;
    pressurizing said combined flow within said closed container primary zones and maintaining said pressurized combined flow to a predetermined first fluid pressure level of substantially between 100 and 150 PSIG within said closed container primary zones;
    directing said pressurized combined flow from said closed container primary zones to said closed container secondary zone through a pair of plate/disks having one or more orifices/ports in each of said plate/disks thus restricting flow of said combined flow through said orifice/ports; and
    measuring and maintaining a predetermined second fluid pressure level within said closed container secondary zone within a pressure differential range of substantially 60 percent of said combined flow within said closed container primary zones, with a backpressure regulator mounted to and in communication with a combined flow outlet conduit, where said combined flow outlet conduit is mounted to said closed container secondary zone, to thereby generate micro and nano bubbles in said combined flow downstream of said backpressure regulator.

11. The method according to claim 10, wherein said combined flow is substantially between 60 and 100 PSIG within said closed container secondary zone, within the pressure range within said closed container primary zones.

12. The method according to claim 10, further comprising the step of reducing any residual gas that collects in said closed container secondary zone through an excess vapour vent exhausting to the outside atmosphere.

13. The method according to claim 10, wherein each of said closed container primary zones is substantially 30 percent of said closed container secondary zone size.

14. The method according to claim 10, wherein said orifice/ports are a diameter of between 0.2 of an inch and 0.4 of an inch.

15. The method according to claim 10, wherein amount of said orifice/ports on each of said plate/discs are normally between 1 and 10, depending on flow volume characteristics and total flow volume requirements.

16. The method according to claim 10, wherein said closed container is capable of being duplicated in a parallel circuit at least once and up to multiple times, depending on flow volume characteristics and total flow volume requirements.

17. The method according to claim 10, wherein injecting of said gas into said liquid is through a gas feed conduit directly into said closed container primary zones to create said combined flow.

18. The method according to claim 17, further comprising micro and nano bubble calibration adjusting steps comprising:
    a) predetermining said combined flow;
    b) predetermining said diameter and/or said number of the orifice/ports;
    c) predetermining said combined flow pressure in said primary zones:
    d) measuring and adjusting said combined flow pressure in said secondary zone by adjusting said backpressure;
    e) measuring size of said micro and nano bubbles in said outflow conduit;
    f) measuring and adjusting said combined flow pressure in said secondary zone by adjusting said backpressure;
    g) adjusting said pressure differential by adjusting said diameter and/or said number of the orifice/ports;

h) measuring size of said micro and nano bubbles in said outflow conduit;
i) measuring and adjusting said combined flow pressure in said secondary zone by adjusting said backpressure;
j) measuring size of said micro and nano bubbles in said outflow conduit;
k) if micro and nano bubbles are still oversize of five microns then adjusting said combined flow volume capacity by duplicating said closed container in parallel circuit;
l) measuring size of said micro and nano bubbles in said outflow conduit;
m) if micro and nano bubbles are still oversize of five microns then redoing steps above starting with a).

* * * * *